United States Patent
OConnor et al.

(10) Patent No.: US 12,051,216 B2
(45) Date of Patent: Jul. 30, 2024

(54) SYSTEM AND METHODS FOR VISUALIZING VARIATIONS IN LABELED IMAGE SEQUENCES FOR DEVELOPMENT OF MACHINE LEARNING MODELS

(71) Applicant: GE Precision Healthcare LLC, Milwaukee, WI (US)

(72) Inventors: Sean P. OConnor, San Francisco, CA (US); Justin Tyler Wright, San Ramon, CA (US); Ravi Soni, San Ramon, CA (US); James Gualtieri, Pittsburgh, PA (US); Kristin Anderson, Alameda, CA (US)

(73) Assignee: GE PRECISION HEALTHCARE LLC, Milwaukee, WI (US)

( * ) Notice: Subject to any disclaimer, the term of this patent is extended or adjusted under 35 U.S.C. 154(b) by 592 days.

(21) Appl. No.: 17/375,982

(22) Filed: Jul. 14, 2021

(65) Prior Publication Data
US 2023/0016464 A1 Jan. 19, 2023

(51) Int. Cl.
*G06T 7/38* (2017.01)
*G06F 3/0481* (2022.01)
(Continued)

(52) U.S. Cl.
CPC ............ *G06T 7/38* (2017.01); *G06F 3/04842* (2013.01); *G06F 18/2155* (2023.01);
(Continued)

(58) Field of Classification Search
None
See application file for complete search history.

(56) References Cited

U.S. PATENT DOCUMENTS 7,778,485 B2 * 8/2010 Zeineh ................. G02B 21/367
382/284
8,600,194 B2 * 12/2013 Doepke ............... H04N 23/698
382/284
(Continued)

FOREIGN PATENT DOCUMENTS

CN 110149491 A * 8/2019 ............. H04N 21/44
WO WO-2010022185 A1 * 2/2010 ......... G05D 23/1905
(Continued)

OTHER PUBLICATIONS

"Simple guide to confusion matrix terminology," Data School Website, Available Online at https://www.dataschool.io/simple-guide-to-confusion-matrix-terminology/, Mar. 25, 2014, 16 pages.
(Continued)

*Primary Examiner* — Mohammed Rachedine
(74) *Attorney, Agent, or Firm* — McCoy Russell LLP

(57) ABSTRACT

The current disclosure provides methods and systems for visualizing, comparing, and navigating through, labeled image sequences. In one example, a degree of variation between a plurality of labels for an image in a sequence of images may be encoded as a comparison metric, and the comparison metric for each image may be graphed as a function of image position in the sequence of images, thereby providing a contextually rich view of label variation as a function of progression through the sequence of images. Further, the encoded variation of image labels may be used to automatically flag inconsistently labeled images, wherein the flagged images may be highlighted in a graphical user interface presented to a user, pruned from a training dataset, or a loss associated with the flagged image may be scaled based on the encoded variation during training of a machine learning model.

20 Claims, 8 Drawing Sheets
(5 of 8 Drawing Sheet(s) Filed in Color)

(51) Int. Cl.
| | |
|---|---|
| G06F 3/04842 | (2022.01) |
| G06F 3/04845 | (2022.01) |
| G06F 3/04847 | (2022.01) |
| G06F 3/0485 | (2022.01) |
| G06F 18/214 | (2023.01) |
| G06F 18/2431 | (2023.01) |
| G06N 20/00 | (2019.01) |
| G06T 7/00 | (2017.01) |
| G06T 7/11 | (2017.01) |
| G06T 7/136 | (2017.01) |
| G06V 10/25 | (2022.01) |
| G06V 10/774 | (2022.01) |

(52) U.S. Cl.
CPC ......... G06F 18/2431 (2023.01); G06N 20/00 (2019.01); G06T 7/0012 (2013.01); G06T 7/11 (2017.01); G06T 7/136 (2017.01); G06V 10/25 (2022.01)

(56) References Cited

U.S. PATENT DOCUMENTS

| | | | |
|---|---|---|---|
| 8,606,021 B2 * | 12/2013 | Conwell | G06F 18/40 707/723 |
| 11,562,319 B1 * | 1/2023 | Chandiran | G06N 20/00 |
| 2021/0105578 A1 * | 4/2021 | Chen | H04R 3/12 |

FOREIGN PATENT DOCUMENTS

| | | | | |
|---|---|---|---|---|
| WO | WO-2020181066 A1 * | 9/2020 | ............. | G06F 18/21 |
| WO | WO-2020210278 A1 * | 10/2020 | ............. | A61B 6/032 |
| WO | WO-2021219979 A1 * | 11/2021 | ............. | G06T 7/0012 |

OTHER PUBLICATIONS

"Everything About Data Science: Confusion Matrix," Scary Scientist Blogspot Website, Available Online at http://scaryscientist.blogspot.com/2016/03/confusion-matrix.html, Mar. 24, 2016, 13 pages.

Tong, T. et al., "Five-class Differential Diagnostic of Neurodegenrative Diseases using Random Undersampling Boosting," NeuroImage: Clinical, vol. 15, No. C, Jun. 2017, 20 pages.

Draelos, R., "Measuring Performance: The Confusion Matrix," Glass Box Medicine Website, Available Online at https://glassboxmedicine.com/2019/02/17/measuring-performance-the-confusion-matrix/, Feb. 17, 2019, 5 pages.

"Data Science and Machine Learning: Confusion Matrix," Manisha—Sirsat Blogspot Website, Available Online at https://manisha-sirsat.blogspot.com/2019/04/confusion-matrix.html, Apr. 29, 2019, 8 pages.

Wisdom, B., "Understanding the Confusion Matrix (II)," Dev.to Website, Available Online at https://dev.to/overrideveloper/understanding-the-confusion-matrix-264i, May 5, 2019, 13 pages.

Widmann, M., "From Modeling to Scoring: Confusion Matrix and Class Statistics," KNIME Website, Available Online at https://www.knime.com/blog/from-modeling-to-scoring-confusion-matrix-and-class-statistics, May 27, 2019, 13 pages.

Rekha M., "Churning the Confusion out of the Confusion Matrix," Cairvoyant Blog Website, Available Online at https://blog.clairvoyantsoft.com/churning-the-confusion-out-of-the-confusion-matrix-b74fb806e66, Sep. 23, 2019, 8 pages.

Bhandari, A., "Everything you Should Know about Confusion Matrix for Machine Learning," Analytics Vidhya Wesbite, Available Online at https://www.analyticsvidhya.com/blog/2020/04/confusion-matrix-machine-learning/, Apr. 17, 2020, 22 pages.

Versloot, C., "How to create a confusion matrix with Scikit-learn?," Machine Curve Website, Available Online at https://www.machinecurve.com/index.php/2020/05/05/how-to-create-a-confusion-matrix-with-scikit-learn/, May 5, 2020, 28 pages.

Mohajon, J., "Confusion Matrix for You Multi-Class Machine Learning Model," Towards Data Science Website, Available Online at https://towardsdatascience.com/confusion-matrix-for-your-multi-class-machine-learning-model-ff9aa3bf7826, May 28, 2020, 10 pages.

Nelson, D., "What is a Confusion Matrix," Unite AI Website, Available Online at https://www.unite.ai/what-is-a-confusion-matrix/, Aug. 23, 2020, 5 pages.

"Confusion Matrix," Packt Website, Available Online at https://subscription.packtpub.com/book/big_data_and_business_intelligence/9781838555078/6/ch06lvl1sec34/confusion-matrix, Available as Early as Nov. 23, 2020, 3 pages.

* cited by examiner

SYSTEM AND METHODS FOR VISUALIZING VARIATIONS IN LABELED IMAGE SEQUENCES FOR DEVELOPMENT OF MACHINE LEARNING MODELS

FIELD

Embodiments of the subject matter disclosed herein relate to evaluation of machine learning model performance relative to ground truth data in image sequence labeling, and generation of ground truth data for image sequence labeling.

BACKGROUND

Many machine learning (ML) models employ labeled datasets to "learn" a mapping from a set of input features to a desired output, such as a class label or regression value. The "desired output" for a particular set of input features is generally specified by a human annotator, and may be referred to as the ground truth. The performance of a ML model may be constrained by the quality of the ground truth data used during a training process, as an upper limit to ML model accuracy is the accuracy of the ground truth labels themselves. Therefore, it is generally desirable to explore approaches for increasing the accuracy/consistency of ground truth labels provided by human annotators. Further, as availability of labeled data is a recognized bottleneck in the field of ML, it is further desirable to explore approaches for increasing speed of ground truth data generation.

In addition to being used in training of ML models, ground truth data may be used in evaluation of trained ML models. Although seemingly straightforward, evaluation of a trained ML model by comparison with ground truth data may be complicated by the form of the output of the ML model. As an example, in binary classification, where a model predicts if a particular input does or does not belong to a particular class, evaluation of model performance may be relatively straightforward. However, in cases where the model output comprises a plurality of labels/values, such as a three-dimensional (3D) segmentation mask predicted by an ML model for a region of interest in a 3D image, evaluation of model performance may be difficult, as some regions of the 3D segmentation mask may closely match a ground truth label, whereas other regions of the same 3D segmentation mask may diverge substantially from the ground truth label. Current approaches for visualizing and quantifying ML model performance relative to a ground truth dataset may fail to capture intra-sample variation of model accuracy. Therefore, it is generally desirable to explore approaches for visualizing and quantifying ML model performance relative to ground truth data which captures intra-sample variations in model accuracy.

SUMMARY

The present disclosure teaches systems and methods which at least partially address the issues described above. In one embodiment, variations between a first label set and a second label set for a sequence of images may be efficiently visualized by, selecting an image from the sequence of images, wherein the image includes an index indicating a position of the image in the sequence of images, determining a first metric for the image, wherein the first metric encodes a first label of the first label set assigned to the image, determining a second metric for the image, wherein the second metric encodes a second label of the second label set assigned to the image, generating a plot, wherein the first metric and the second metric are graphed as a function of the index of the image, and displaying the plot via a display device. In this way, trends of variation/divergence between a first label set and a second label set assigned to a sequence of images, may be visualized in a compact form. The sample may be a 3D image comprising a sequence of two-dimensional (2D) image slices, or a video comprising a sequence of 2D or 3D frames. The plot enables intra-sample variations between multiple label sets, such as between labels produced by a first annotator and a second annotator, or between ML model predictions and ground truth, to be efficiently visualized as a function of image index in a multi-image sample.

Further, efficient navigation amongst the images included in the image sequence based on variation between the first label set and the second label set may be enabled by, receiving a selection of a region of the plot corresponding to the image, retrieving the image from the sequence of images, retrieving the first label and the second label, and displaying the image, the plot, the first label, and the second label, via the display device. In this way, the above embodiment provides for rapid navigation to images within a sequence of images based on variation between a first label set and a second label set.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The patent or application file contains at least one drawing executed in color. Copies of this patent or patent application publication with color drawings will be provided by the Office upon request and payment of the necessary fee.

The present disclosure will be better understood from reading the following description of non-limiting embodiments, with reference to the attached drawings, wherein below.

DETAILED DESCRIPTION

Figure 1:
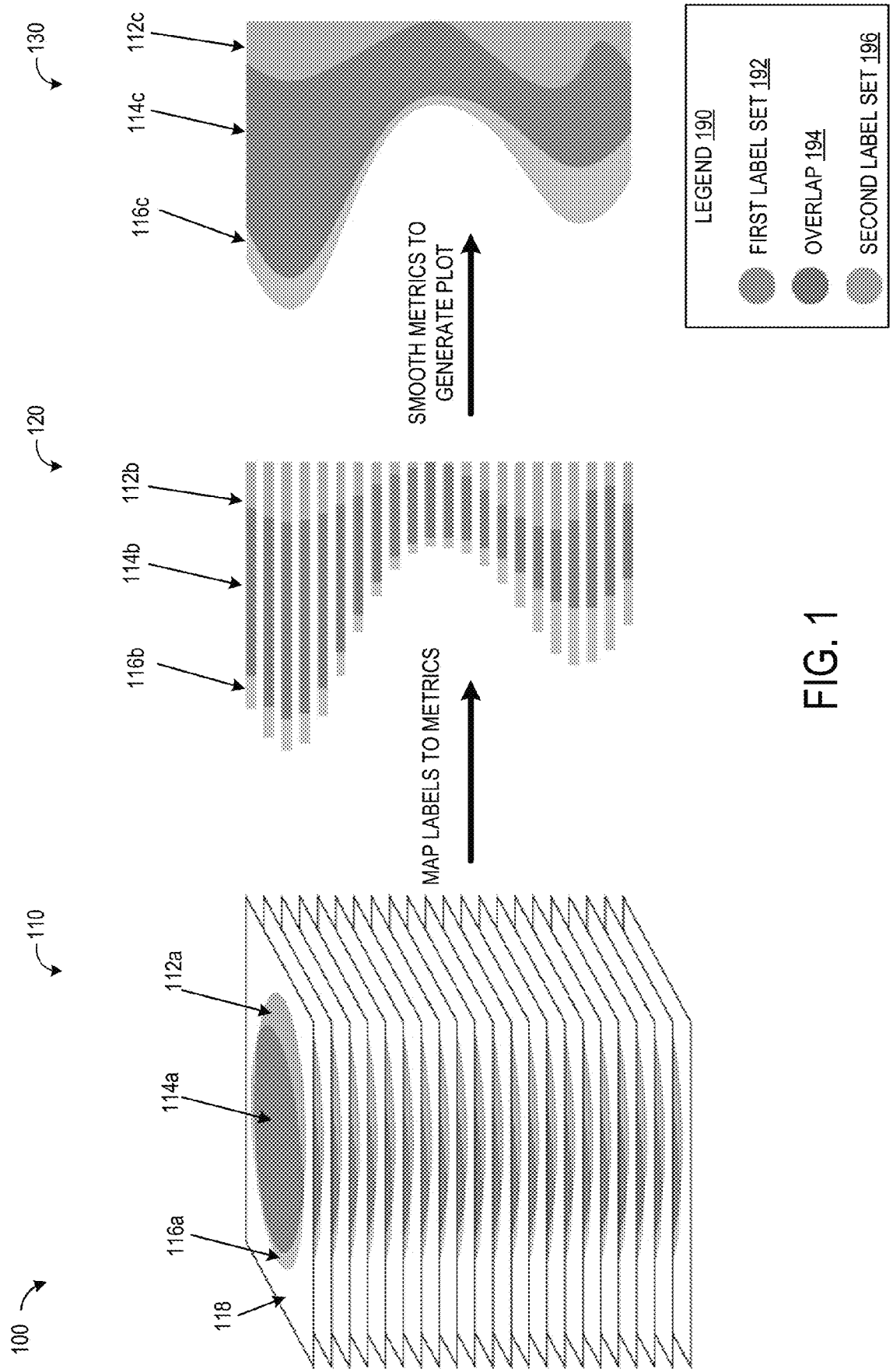
FIG. 1 shows an illustration of an exemplary process by which a plurality of multi-dimensional labels assigned to a sequence of images may be mapped to a two-dimensional plot compactly representing the label variation through the sequence of images.

The following description provides systems and methods for visualizing, comparing, and navigating through, labeled image sequences. In a first aspect, the current disclosure is directed to comparing labels generated by a machine learning (ML) model for an image sequence, with ground truth labels for the same image sequence, in order to assess the viability and accuracy of the ML model. Conventionally, statistical graphs, such as a loss curve or a confusion matrix, are used to represent the performance of a trained ML model relative to a ground truth label set. However, such conventional approaches are not well suited to comparing ML model predictions with ground truth in image sequences, such as 3D images comprising a plurality of 2D image "slices", or in 2D or 3D videos, which comprise a sequence of 2D frames or 3D frames, respectively. Such conventional approaches lack spatial granularity (in the case of 3D images) or temporal granularity (in the case of videos) in their assessment of ML model performance. As an example, an ML model trained to segment a 3D region of interest (ROI) in a 3D image (comprising a sequence of 2D images) may conventionally be evaluated by determining a total number of false-positive (FP) mask pixels, true-positive (TP) mask pixels, and false-negative (FN) mask pixels, predicted by the ML model. However, by determining the FP, TP, and FN values over the entire sequence of 2D images, information regarding which sub-regions of the 3D segmentation mask conform well to the ground truth segmentation mask, and which sub-regions diverge from the ground truth segmentation mask, are lost.

The current disclosure addresses the above issue by providing finer spatial/temporal granularity in ML model evaluation. In particular, by determining for each image of a sequence of images a comparison metric between a segmentation mask predicted by an ML model and a ground truth segmentation mask, and graphing the comparison metric as a function of image index, wherein the index of an image indicates a position of the image within the image sequence, sub-regions of a predicted segmentation mask for a sequence of images which conform to the ground truth, and sub-regions of the predicted segmentation mask which diverge from the ground truth, may be rapidly identified. Further, trends in the accuracy of the ML model as a function of position within the image sequence may more easily be identified, as the performance of the ML model predictions for a particular image in the sequence of images is visualized in the larger context of the ML model's performance through the entire sequence of images.

In a second aspect, the current disclosure is directed to tracking the consistency and/or accuracy of individual annotators working within a group of annotators to generate ground truth data. The current disclosure enables two or more annotators to annotate the same sequence of images, and automatically compare and visualize the similarity and consistency of the ground truth labels produced by the two annotators. By providing a metricized comparison between ground truth annotators of the same sequence of images, divergent annotator performance may be automatically identified, and more consistent and accurate ground truth data may be generated. Further, variation between ground truth labels produced by two or more annotators for a particular image may be used to automatically scale a loss value determined for the image during a downstream training process, and/or may be used to automatically prune highly divergent annotations from a training dataset, without discarding the entire image sequence.

Figure 4:
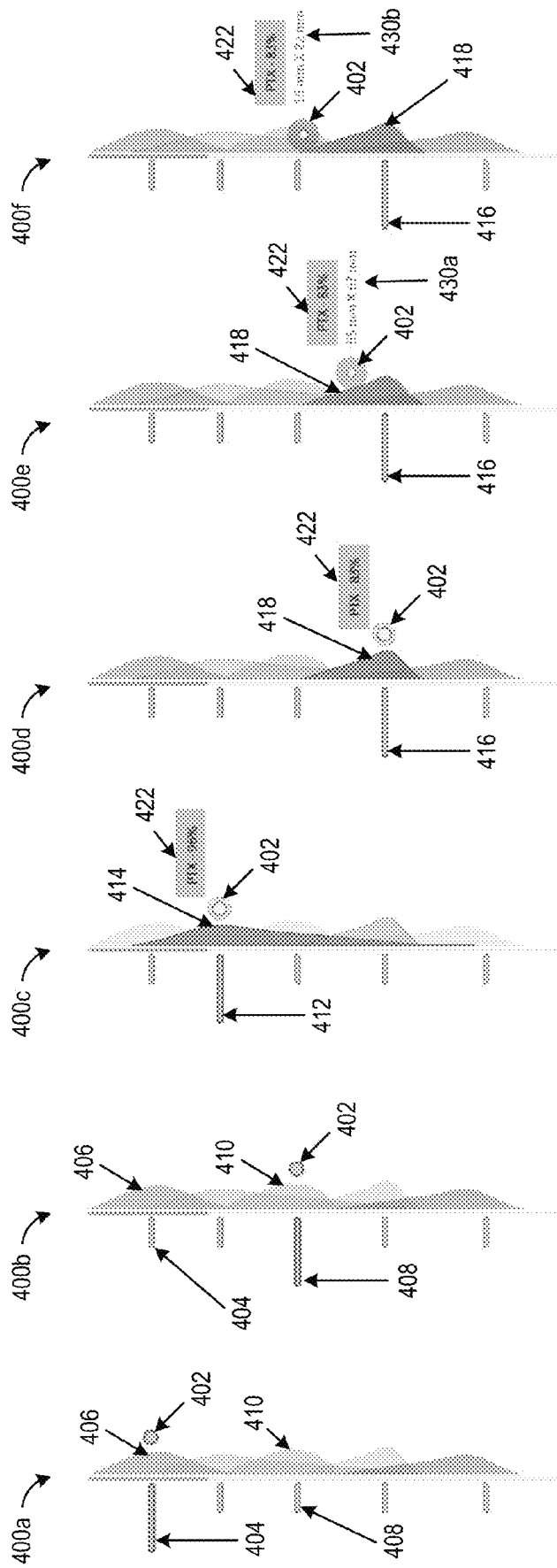
FIG. 4 shows embodiments of graphical user interface adjustments which may be performed in response to user input received by a user input device.
Figure 5:
FIG. 5 shows a second embodiment of a graphical user interface for displaying label variation as a function of image index.
Figure 6:
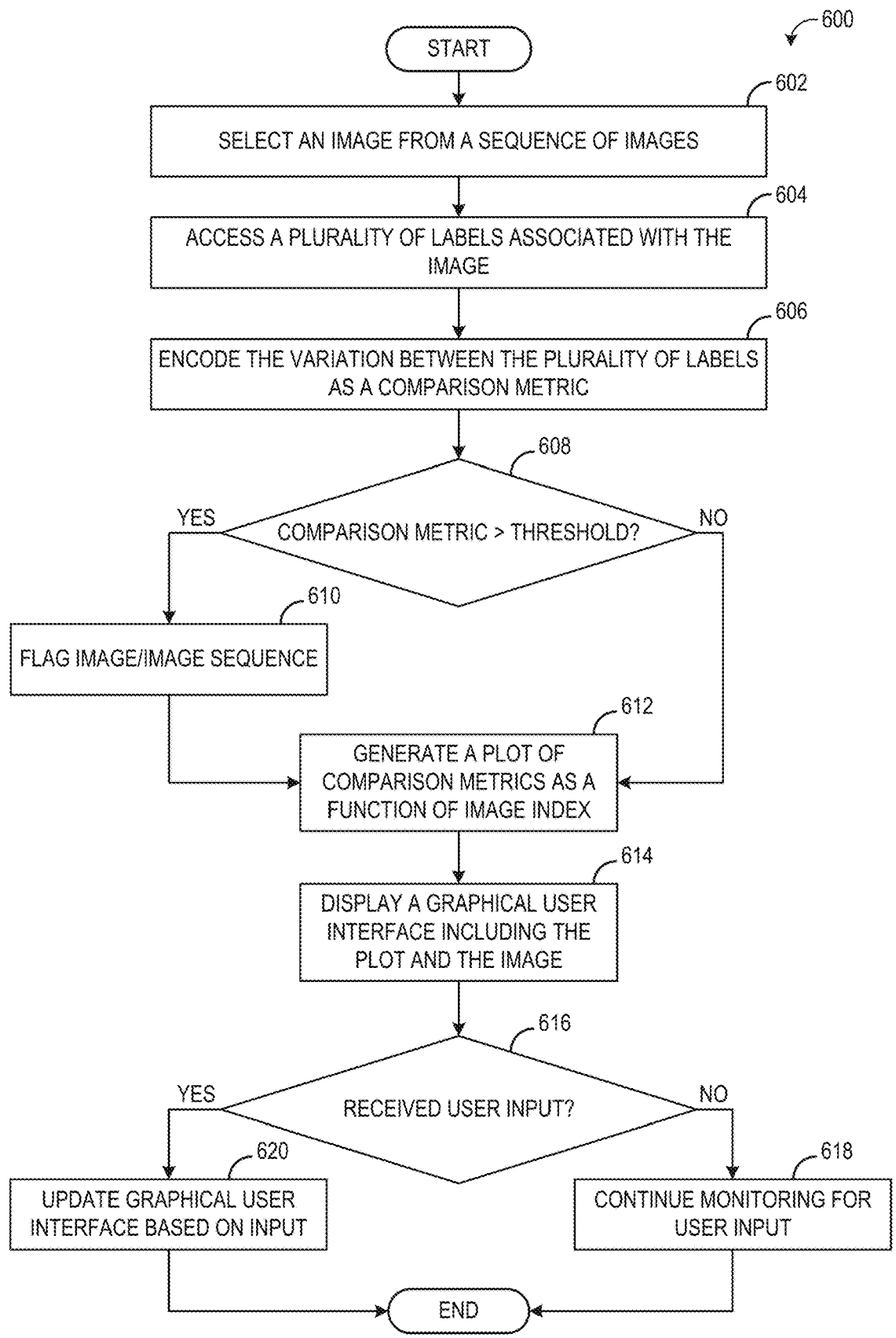
FIG. 6 shows an embodiment of a method for producing a plot of comparison metric as a function of image index.
Figure 7:
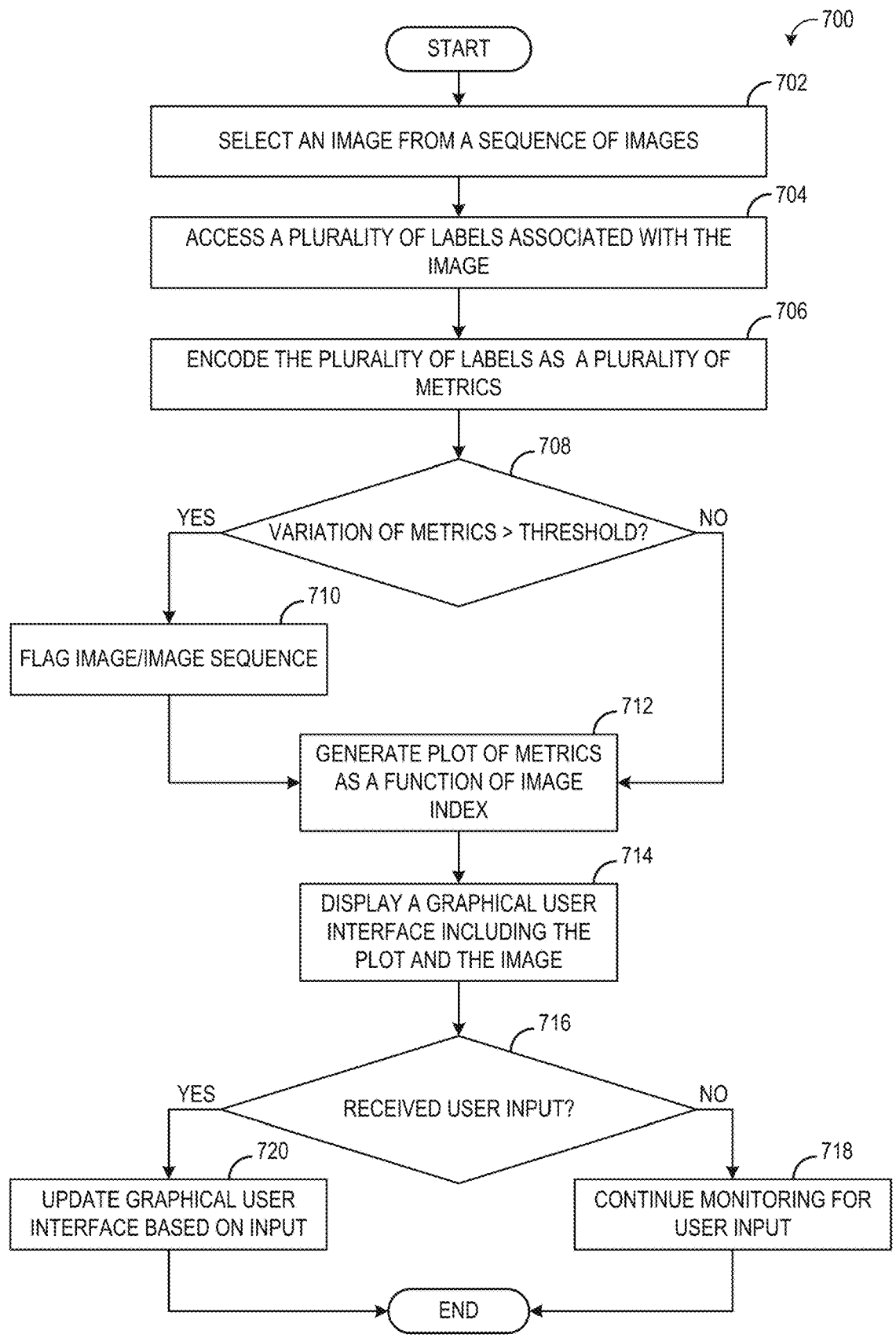
FIG. 7 shows an embodiment of a method for producing a plot of encoded labels as a function of image index.

In one embodiment, a sequence of labeled images may be processed as illustrated by process 100, shown in FIG. 1, to produce a plot 130 of comparison metric versus image index. The comparison metrics of plot 130 may be generated from labeled images, as illustrated by process 200 shown in FIG. 2, wherein multi-dimensional labels 210 are mapped to scalar comparison metrics 220. Plots, such as the plot generated according to the exemplary process 100 shown in FIG. 1, may be used in a graphical user interface (GUI), such as GUI 300 shown in FIG. 3, to provide a contextual view of label variation between two or more label sets through a sequence of labeled images. GUI 300 further provides for efficient navigation through the image sequence by enabling an image from the sequence of images to be displayed in response to user interaction with the plot 320, thereby enabling a user to rapidly navigate to images of interest, such as images where a comparison metric between a first label set and a second label set is greater than a threshold. FIG. 4 provides further embodiments of plot adjustments which may be performed dynamically in response to user input received in real time, enabling a user to interact with comparison metric data and easily navigate to an image of interest based on the comparison metric data. FIG. 5 shows a second embodiment of a GUI 500, which may advantageously employ plots of label variation as a function of image index, such as the plot generated in FIG. 1, to visualize intra-sample label variation, wherein the sample comprises a sequence of images. FIG. 6 provides a first embodiment of a method 600 for comparing two or more label sets for a sequence of images, wherein images with greater than a threshold divergence between the two or more label sets (as measured by a comparison metric), may be automatically flagged for further downstream review/processing/pruning. Similarly, FIG. 7 provides a second embodiment of a method 700 for comparing two or more label sets, wherein labels for each of the two or more label sets are encoded as separate metrics, as opposed to being combined into a comparison metric. Methods 600 and/or 700 may be executed by a computing system, such as computing system 800, shown in FIG. 8.

As used herein, the term image index, index, or other similar terms, may refer to a number or other identifier indicating an order, or position, of an image within an image sequence, wherein an image sequence is an ordered series of images composing a larger data structure such as a 3D image or a video. As an example, each image in a sequence of images may be uniquely identified by a corresponding index. For a video comprising a plurality of frames, each frame in the video may include an index corresponding to a point in time. In one example, an index for a frame in a video may comprise a timestamp. In another example, for a sequence of images composing a 3D image, the index of an image for may correspond to a particular plane passing through the 3D image.

Turning to FIG. 1, an exemplary process 100 for automatically generating a plot 130 from a labeled image sequence 110, is illustrated. As shown by legend 190, labeled image sequence 110 comprises a "stack" of 2D images, wherein each image comprises a first 2D segmentation mask belonging to a first label set 192, and a second 2D segmentation mask belonging to a second label set 196.

Regions where segmentation masks from the first label set 192 intersect with segmentation masks from the second label set 196 are referred to as overlap 194. Labeled image sequence 110 may represent a plurality of 2D frames of a video, or a plurality of 2D image slices of a 3D image. As an example, the first label set 192 may comprise ground truth labels, and the second label set 196 may comprise predictions made by a ML model. In another example, the first label set 192 may comprise ground truth annotations produced by a first annotator, and the second label set 196 may comprise ground truth annotations produced by a second annotator. Images of the labeled image sequence 110 may include a label from the first label set 192 but not the second label set 196, a label from the second label set 196 but not the first label set 192, a label from both the first label set 192 and the second label set 196, or a label from neither the first label set 192 nor second label set 196.

The areas of each 2D image in the labeled image sequence 110 may be divided into an area including only a label from the first label set 192, an area including only a label from the second label set 196, an area of overlap 194 between a label from the first label set 192 and the second label set 196, and an area devoid of both labels from the first label set 192 and the second label set 196. As illustrated in FIG. 1, a first image 118 of the labeled image sequence 110 includes a first region 112a occupied by a 2D segmentation mask from the first label set 192, a second region 116a occupied by a 2D segmentation mask from the second label set 196, and a third region 114a occupied representing overlap between the segmentation masks from the first label set 192 and the second label set 196.

The labeled image sequence 110 may be transformed into a plurality of comparison metrics 120 by mapping the plurality of labels of each image of the labeled image sequence 110 to one or more corresponding comparison metrics. In the example shown by process 100, each image of labeled image sequence 110 comprises a first segmentation mask, and a second segmentation mask. As segmentation masks comprise a 2D or 3D cloud of pixels or voxels assigned to a particular class, such as an ROI in an image, segmentation masks may be referred to herein as multi-dimensional labels. Multi-dimensional labels may be difficult to efficiently visualize, particularly when attempting to visualize a series or sequence of multi-dimensional labels, as the computational complexity and memory requirements for such a visualization may be large, particularly for longer image sequences, higher dimensional labels, and/or when large numbers of separate label sets are being compared. Further, visualizing comparisons between multiple label sets, wherein each label set comprises a separate sequence of multi-dimensional labels, may be even more computationally complex and more memory consumptive. Additionally, visualization of sequences of multi-dimensional labels may be difficult for a user to draw meaningful conclusions from, as trends in the data may be difficult for a user to parse. The inventors herein have developed approaches for addressing the above issue, in particular, by mapping each of a plurality of multi-dimensional labels for an image in an image sequence, to a lower dimensional representation, such as a scalar comparison metric, trends in variation between the label sets in image sequences may be generated at reduced computational expense (both in terms of computational efficiency and memory footprint). Further, lower dimensional representations of label set variance in image sequences may better enable a user to visually parse trends in the data.

In the example illustrated by FIG. 1, each image of labeled image sequence 110 comprises a first segmentation mask and a second segmentation mask, with optionally an area of intersection where both the first segmentation mask and the second segmentation mask overlap. The variation between the first segmentation mask and the second segmentation mask for an image from the labeled image sequence 110 may be compactly represented as three scalar comparison metrics, namely, an area occupied by the first segmentation mask (and not the second segmentation mask), an area occupied by the second segmentation mask (and not the first segmentation mask), and an area occupied by both the first segmentation mask and the second segmentation mask. These three areas may each be represented as a scalar value, and may be considered as belonging to a broader class herein referred to as comparison metrics. In the example shown in process 100, first image 118 includes a first region 112a occupied by a first segmentation mask (and not the second segmentation mask), a second region 116a occupied by the second segmentation mask (and not the first segmentation mask), and a third region 114a occupied by both the first segmentation mask and the second segmentation mask. The first region 112a, the second region 116a, and the third region 114a of the first image 118 may be encoded as scalar values by determining the areas/volumes of each of these regions, based on a number of pixels bounded by said regions, wherein the areas/volumes represent scalar comparison metrics between the first segmentation mask and the second segmentation mask in the first image 118. In particular, first region 112a may be mapped to first area 112b, second region 116a may be mapped to second area 116b, and third region 114a may be mapped to third area 114b. In embodiments wherein the first label set 192 comprises an ML model's predictions, and the second label set 196 comprises a ground truth label set, the first area 112b encodes the false positive (FP) prediction made by the ML model in the first image 118, the second area 116b encodes the false negative (FN) prediction made by the ML model in the first image 118, and the third area 114b encodes the true positive (TP) prediction made by the ML model in the first image 118.

Each image of labeled image sequence 110 may be processed in a manner similar to that described above for first image 118, to produce the plurality of comparison metrics 120. Each image of labeled image sequence 110 may include an index, indicating a position or order of the image within the labeled image sequence 110. For example, first image 118 may include the index 0, indicating first image 118 occurs before images with index 1, 2, etc. The order of comparison metrics in the plurality of comparison metrics 120 may be based on an index associated with an image from which the matric was produced. Therefore, the order of comparison metrics in the plurality of comparison metrics 120 may correspond to the order of images in labeled image sequence 110.

The plurality of comparison metrics 120, which comprise a sequence of discrete sets of values, one set of comparison metrics for each image in labeled image sequence 110, may be graphed as a function of image index and smoothed to form a continuous plot 130. In one example, smoothing the sequence of comparison metrics 120 may include fitting a differentiable function to the comparison metrics, and plotting the values of the differentiable function to form plot 130. In another example, a weighted rolling average may be used to smooth the sequence of comparison metrics 120. In another example, smoothing techniques such as Fourier smoothing, double exponential smoothing, single exponential smoothing, Holt-Winters smoothing, or other smoothing techniques known in the art may be used. In one example, Bayesian and other statistical variant models may be used to smooth a sequence of comparison metrics, such as comparison metrics 120, to form a smooth continuous plot, such as plot 130. As shown in FIG. 1, the comparison metrics encoded for the first image 118, namely the first area 112*b*, the second area 116*b*, and the third area 114*b*, are graphed to a first region 112*c*, a second region 116*c*, and a third region 114*c*, on plot 130, respectively. The width of each of the first region 112*c*, the second region 116*c*, and the third region 114*c*, is proportional to first area 112*b*, the second area 116*b*, and the third area 114*b*, respectively. Plot 130 clearly shows the variation between the first label set 192 and the second label set 196 through the labeled image sequence 110.

Figure 2:
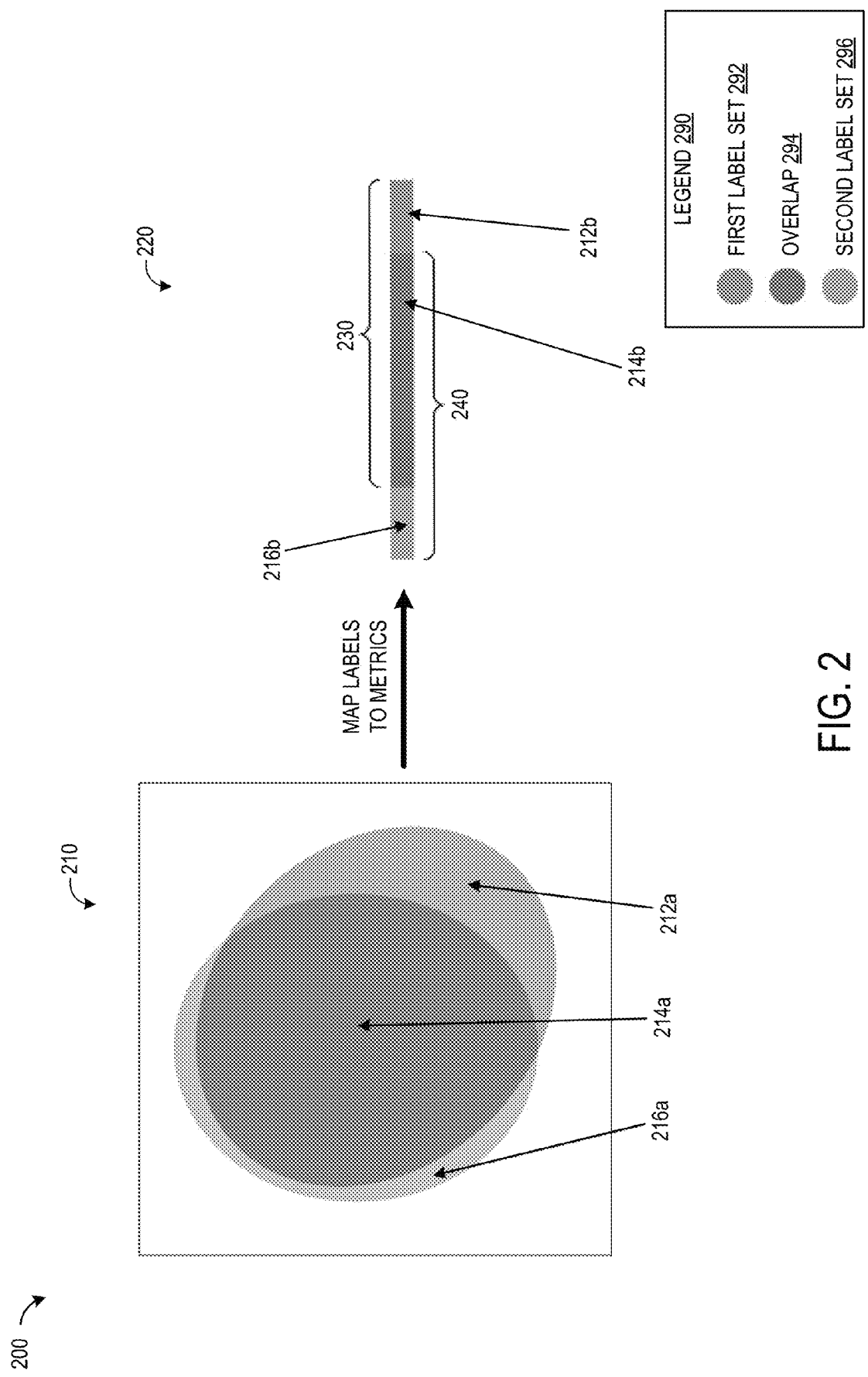
FIG. 2 shows an embodiment of a process by which a plurality of multi-dimensional labels may be encoded as scalar comparison metrics.

Turning to FIG. 2, a more detailed illustration of an exemplary process 200 for mapping multi-dimensional labels to comparison metrics is shown. Process 200 shows a labeled image 210, including a first segmentation mask and a second segmentation mask. As indicated by legend 290, the first segmentation mask belongs to a first label set 292 and the second segmentation mask belongs to a second label set 296, with regions where the first segmentation mask and the second segmentation mask overlap, shown by overlap 294. Labeled image 210 includes a first region 212*a*, occupied by the first segmentation mask and not the second segmentation mask, a second region 216*a*, occupied by the second segmentation mask and not the first segmentation mask, and a third region 214*a*, occupied by both the first segmentation mask and the second segmentation mask. The variation, or degree of match, between the first segmentation mask and the second segmentation mask, in image 210, may be encoded as a set of three scalar values, referred to as comparison metrics. In particular, the size of third region 214*a* relative to the sizes of first region 212*a* and second region 216*a* indicates the degree of match between the first segmentation mask and the second segmentation.

The sizes of the first region 212*a*, the second region 216*a*, and the third region 214*a*, may be determined based on a number of pixels (in the case of 2D images) or voxels (in the case of 3D images) of image 210 bounded by each of the respective regions. Although shown as a 2D image, it will be appreciated that image 210 may comprise a 2D or a 3D image, and the first segmentation mask and second segmentation mask may be 2D or 3D segmentation masks. As shown in process 200, the size of the first region 212*a* is encoded in the length of first segment 212*b*, the size of the second region 216*a* is encoded in the length of second segment 216*b*, and the size of the third region 214*a* is encoded in the width of third segment 214*b*. It will be noted that the total size of the image 210 occupied by the first segmentation mask is indicated by the sum 230 of the first segment 212*b* and the third segment 214*b*. Similarly, the total size of the image 210 occupied by the second segmentation mask is indicated by the sum 240 of the second segment 216*b* and the third segment 214*b*. Together, the first segment 212*b*, the second segment 216*b*, and the third segment 214*b*, compose a comparison metric 220, which may be used to produce a plot, such as plot 130 shown in FIG. 1.

Figure 3:
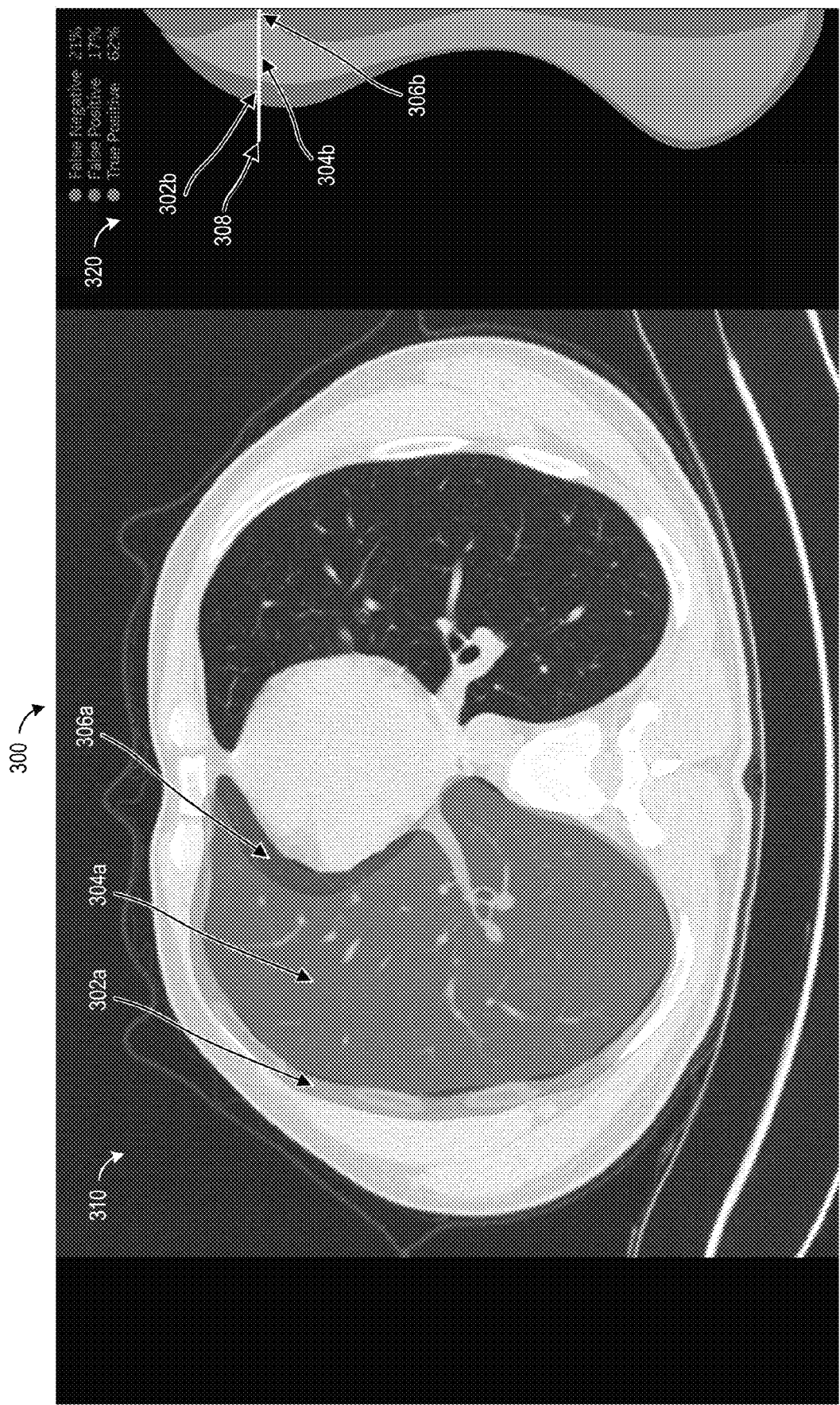
FIG. 3 shows a first embodiment of a graphical user interface for displaying label variation as a function of image index.

Turning to FIG. 3, a GUI 300 for visualizing variations between at least a first label set and a second label set for an image sequence, is shown. GUI 300 includes a plot 320, showing one or more comparison metrics between two or more label sets, as a function of image position/index within the image sequence.

GUI 300 further includes image 310. Image 310 is a 2D image from a position in the image sequence corresponding to the position of the navigation element 308 in plot 320. Navigation element 308 is a selectable and adjustable, such that a user may navigate through the image sequence by adjusting a position of the navigation element 308 relative to plot 320.

Image 310 is shown with a first segmentation mask and a second segmentation mask superimposed thereon. The area of first region 302*a* is encoded as the length of first segment 302*b* of plot 320. Similarly, the area of second region 306*a* is encoded as the length of second segment 306*b* of plot 320, the area of third region 304*a* is encoded as the length of the third segment 304*b* of plot 320.

Turning to FIG. 4, plots 400*a*-400*f* are shown. Plots 400*a*-400*f* illustrate display elements and dynamic adjustments which may enable a user to more easily navigate through a sequence of images based on label variation. Plots 400*a*-400*f* comprise color coded metrics encoding label sets applied to a sequence of images. The color coded metrics are graphed as a function of image index for each image in the image sequence, providing a compact and easily visually parsed representation of variations between a plurality of label sets applied to the sequence of images. Each distinct color corresponds to a distinct label set. In one example, plots 400*a*-400*f* may be displayed via a GUI, such as GUI 300 or GUI 500, and may enable a user to efficiently and intuitively navigate through a labeled sequence of images. Further, the interactions illustrated by plots 400*a*-400*f* enable rapid access to information regarding the plurality of label sets applied to the sequence of images.

Referring to first plot 400*a*, a navigation element 402, a first label set navigator 404 corresponding to a first encoded label set 406, and a second label set navigator 408 corresponding to a second encoded label set 410, are shown. Navigation element 402 is a selectable interface element which may be dynamically repositioned relative to plot 400*a* based on user input. In one embodiment, movement of navigation element 402 may occur in response to input received from a user input device, such as a mouse, touchscreen, keyboard, or other user input devices known in the art of computing systems. In some embodiments, a currently displayed image from the sequence of images may be determined based on the position of navigation element 402 relative to plot 400*a*. In some embodiments, navigation element 402 may enable a user to set location pins flagging one or more images from the sequence of images, thereby enabling rapid access to the pinned images.

First label set navigator 404, as shown in plot 400*a*, visually indicates a currently selected label set of the plurality of label sets, and provides an additional means for a user to quickly navigate to through the sequence of images based on label set. As shown in first plot 400*a*, the first encoded label set 406 is currently selected, as indicated by the increased length of first label set navigator 404 relative to other label set navigators included in first plot 400*a*, such as second label set navigator 408 which corresponds to second label set 410. In one embodiment, a default position of the label set navigators (such as first label set navigator 404 and second label set navigator 408) are automatically set proximal to a peak of a corresponding encoded label set. The label set navigators, such as first label set navigator 404 and second label set navigator 408 enable rapid navigation to a "peak" of a corresponding label set, wherein a peak may be determined as a largest encoded metric for the label set, a largest comparison metric, or based on other criterion. In some embodiments, selection of a label set navigator, such as by clicking or otherwise selecting the label set navigator, may cause the selected label set navigator to change in appearance to indicate the selection, such as by increasing in length as shown for first label set navigator 404. Further, in some embodiments, upon selection of a label set navigator, a currently displayed image may be automatically set to the image corresponding to the peak of the encoded label set corresponding to the selected label set navigator.

Once selected, label set navigators may function similarly to navigation element 402, by enabling a user to scroll or otherwise navigate from image to image through the sequence of images. In other words, once selected, a label set navigator may be dynamically repositioned relative to plot 400*a* based on user input. In one embodiment, movement of first label set navigator 404 may occur in response to input received from a user input device, such as a mouse, touchscreen, keyboard, or other user input devices known in the art of computing systems. In some embodiments, a currently displayed image from the sequence of images may be determined based on the position of first label set navigator 404 relative to plot 400*a*.

In some embodiments, selection of a label set navigator, such as first label set navigator 404, may determine which labels (e.g., labels belonging to which label set) are superimposed over a currently displayed image from the image sequence, thus enabling a user to toggle between visualization of different labels over a currently displayed image. In the example shown in first plot 400*a*, a currently displayed image from the sequence of images may include superimposed thereon a label from the first encoded label set 406.

Referring to second plot 400*b*, the navigation element 402 has been adjusted to a position proximal to the peak of the second encoded label set 410. In some embodiments, plot 400*a* may be transformed into plot 400*b* in response to a user selecting the second label set navigator 408. As shown in plot 400*b*, the second label set navigator has been selected, as indicated by the increased length of the second label set navigator 408 relative to the other label set navigators (such as first label set navigator 404). Second plot 400*b* illustrates one embodiment by which a user may navigate through a sequence of images based on a label set of interest, wherein upon selection of a label set navigator corresponding to the label set of interest, a currently displayed image may be set to the image in the image sequence corresponding to the peak of the selected label set. In this way, a user may rapidly navigate to an image or images where the encoded metric for the selected label set are the largest. In some embodiments, the encoded metrics may comprise an size of a region of interest, or a severity of a disease, etc. As another example, a user may wish to further evaluate an image or span of images in a sequence of images which have divergent labels. By enabling navigation to the "peaks" of each distinct label set in a single click, rapid and intuitive access to images in even very long image sequences based on label variation may be enabled.

Referring to third plot 400*c*, the navigation element 402 has been repositioned to be proximal to a peak of third encoded label set 414. In some embodiments, second plot 400*b* may be transformed into third plot 400*c* in response to selection of a third label set navigator 412. Further, third plot 400*c* includes a label set statistic 422, which may be displayed in response to user input. In the example shown in FIG. 4, the label set statistic displays the details of the current encoded metric at the image in the image sequence corresponding to the location of the navigation element 402 and the third label set navigator 412. The label set statistic shown in third plot 400*c* is a percentile of confidence of the finding of pneumothorax (PTX) in 2D image slice of a 3D image of a lung. In other words, as shown in third plot 400*c*, the label set statistic 422 is showing the confidence of accuracy of the machine learning model prediction at the image corresponding to the location of navigation element 402, which for the peak of the third label set is 96% confidence. It will be appreciated that the current disclosure provides for label set statistics which may be different than the encoded label at the currently selected image, and in some examples may comprise values or statistics derived from the encoded label at a currently selected image, or may in some embodiments be representative of the label set as a whole, such as providing a sum of the encoded label values throughout the entire image sequence. In some examples, multiple distinct label set statistics may be shown, and a user may cycle through each of the multiple distinct label set statistics for a particular label set using a user input device, such as by a keystroke or combination of keystrokes.

In one example, the first label set statistic 422 may be displayed in response to a user clicking on or hovering over a region of third plot 400*c* corresponding to the third encoded label set 414, wherein the first label set statistic 422 provides one or more global statistics for the third encoded label set 414. In some embodiments, the first label set statistic 422 may provide an average confidence score for labels of the third encoded label set 414, a total of an area occupied by segmentation masks of the third encoded label set 414, a title or designation for the labels of the third encoded label set 414, and/or a classification score determined based on each of the labels of the third encoded label set 414 (e.g., a probability of the image containing a particular structure of interest based on a plurality of segmentation masks predicted for the sequence of images). The appearance of navigation element 402 in third plot 400*c* has been adjusted as compared to first plot 400*a* and second plot 400*b*, to emphasize that a user selection has been made, and that first label set statistic 422 is being displayed in response. Further, the color of third encoded label set 414 has been adjusted as compared to first plot 400*a* and second plot 400*b*, to emphasize that a user selection of the third encoded label set 414 has been made. In particular, the opacity of the third encoded label set 414 has been increased to visually highlight the regions of third plot 400*c* occupied by the third encoded label set 414.

Referring to fourth plot 400*d*, a user selection of a fourth label set 418 has been made. In one example, fourth plot 400*d* may be transformed into fourth plot 400*d* in response to user selection of fourth label set navigator 416. As shown in fourth plot 400*d*, the label set statistic 422 has been updated to reflect to show a value corresponding to the fourth label set 418. The label set statistic 422 may be displayed in response to a user selecting, or hovering over, a region of fourth plot 400*d* corresponding to fourth encoded label set 418. Similar to third plot 400*c*, fourth plot 400*d* shows navigation element 402, and fourth label set navigator 416 proximal to the peak of the encoded label set for which the displayed statistic pertains. In particular, Fourth plot 400*d* shows navigation element 402 and fourth label set navigator 416 proximal to the peak of the fourth encoded label set 418.

Referring to fifth plot 400*e*, the navigation element 402 is shown with an outer surface tangent to the graph of the fourth encoded label set 418, with a first metric 430*a* displayed proximal to the navigation element 402, and below the label set statistic 422. The first metric 430*a* displays the value of the encoded label/metric from the fourth encoded label set 418 corresponding to the point of contact between the outer surface of the navigation element 402 and the graph of the fourth encoded label set 418. In some embodiments, upon receiving a user input selecting a region of fifth plot 400e corresponding to the fourth encoded label set 418, the navigation element 402 may "snap" to a position of tangency with the graph of the fourth encoded label set 418. In some embodiments, selection of a region may comprise hovering over the region, such as with the cursor of a mouse. In some embodiments, selection of a region may comprise clicking the region via a mouse, touchscreen, or other user input device. By "snapping" the navigation element 402 into contact with a graph of encoded label values, and displaying the encoded label value 430a corresponding to the point of tangency between the graph and the navigation element 402, precise, quantitative metric values may be efficiently visualized, without requiring manual navigation to a particular image of interest within the image sequence.

Referring to sixth plot 400f, the navigation element 402 has "slid" along the top of the fourth encoded label set 418, from the first location shown in plot 400e, to the second location shown in plot 400f As the navigation element slides along the fourth encoded label set 418, a metric value corresponding to a current point of contact/tangency between the first navigation element 402 and the contour of the fourth encoded label set 418 may be displayed. As shown in plot 400f, a second metric 430b is shown, which corresponds to the value of the encoded label/metric of the fourth encoded label set 418 currently in contact with the navigation element 402.

Thus, plots 400a-400f illustrate embodiments of dynamic interface adjustments which may be made in response to input received from a user input device. The GUI adjustments illustrated in FIG. 4 may be made dynamically, in real time, based on user input, thus enabling a user to efficiently visualize, access, and interact with, labels and images from a labeled image sequence. In one example, plots 400a-f may enable a user may identify one or more images in a sequence of images where two or more label sets diverge, and may access the one or more images by selecting a region of a plot, such as plot 400a, which corresponds to the one or more images. In another example, plots 400a-f may enable a user to access an encoded label for one or more images, by hovering over a region of a plot, such as plot 400a, which corresponds to the one or more images, without the need to access or navigate to the one or more images themselves. Although the metrics displayed in plots 400a-400f of FIG. 4 represent encodings of separate label sets, it will be appreciated that the dynamic adjustments and other aspects illustrated in FIG. 4 may be applied to plots of encoded comparison metrics, such as plot 130 shown in FIG. 1.

Turning to FIG. 5, a GUI 500, which may be used for visualizing variations between a plurality of label sets for an image sequence, is shown. GUI 500 includes a plot 512, wherein a plurality of encoded label sets are graphed as a function of image position/index. GUI 500 further includes an image 510 from the image sequence. A user may control which image from the image sequence is displayed by interacting with plot 512. GUI 500 may be displayed as part of one or more methods described herein, such as in methods 600 and 700, at steps 614 and 714, respectively. In one example, GUI 500 may be displayed during an evaluation of one or more ML models on predicting labels for the image sequence. Predictions from an ML model may be referred to as a label set, and labels from a label set may be encoded as a sequence of metrics. The sequence of metrics may be graphed on plot 512, thereby enabling a rapid and contextually rich visualization of variation between the predictions of the one or more ML models through the image sequence. In another example, GUI 500 may be displayed as part of a comparison between annotations made by a plurality of annotators, wherein annotations assigned to the image sequence by a first annotator may be referred to as a first label set, and annotations assigned to the image sequence by a second annotator may be referred to as a second label set, and so on for a plurality of distinct annotators.

GUI 500 includes plot 512, which shows the variation in a plurality of encoded label sets (wherein each label set is shown in a distinct color) as a function of image index. Plot 512 includes a first axis 570, indicating a magnitude of the encoded labels, and a second axis 572, indicating the image index/position within the image sequence. Each position along second axis 572 maps to a corresponding image of the image sequence, wherein images occurring earlier in the image sequence are plotted closer to the top of plot 512 than images occurring later in the image sequence. In other words, a metric determined for an image from a sequence of images may be plotted on plot 512, at a position along the first axis 570 corresponding to a magnitude of the metric, and at a position along the second axis 572 corresponding to the index of the image within the image sequence. In embodiments where the image sequence comprises a plurality of slices of a 3D image, second axis 572 corresponds to a spatial axis extending through the 3D image in a direction perpendicular to each of the planes corresponding to the plurality of slices. In embodiments where the image sequence comprises a plurality of frames of a video, second axis 572 corresponds to a temporal axis, wherein each point of temporal axis corresponds to a particular point in time in the video.

Plot 512 includes a navigation element 522, indicating a current position along second axis 572. The navigation element 522 may be positioned along second axis 572 based on input received from a user input device. In some embodiments, the current image 510 displayed by GUI 500 may be determined by the position of navigation element 522 relative to the second axis 572. In some embodiments, upon positioning of the navigation element 522 at a point along second axis 572, an image index may be determined based on the point along second axis 572, and an image, along with one or more labels, may be retrieved from a location in non-transitory memory indicated by the index, wherein the retrieved image may be displayed, with the one or more labels superimposed over the image. In particular, the image 510 displayed by GUI 500 corresponds to the position of navigation element 522 relative to second axis 572 shown in FIG. 5. Further, label set navigator 524 may visually emphasize a currently selected image/label set, and enable rapid navigation to an image or span of images corresponding to labels of a particular label set. In one example a user may select a label set of interest by clicking on the wave contours shown in plot 512 corresponding to the label set of interest, or by selecting a label set navigator (such as first label set navigator 524) corresponding to the label set of interest. In some embodiments, upon selection of a label set, the display of the labels superimposed over a currently displayed image may change. In one example, labels corresponding to a currently selected label set may be shown as solid lines, while labels from unselected label sets may be shown as dashed lines.

Image 510 is a 2D image from a position/index in the image sequence corresponding to the position of the navigation element 522 in plot 512. In the example shown in FIG. 5, image 510 comprises a medical image of a chest of a patient, however it will be appreciated that the current disclosure encompasses images and videos of substantially any type, and is not limited to medical images. In some embodiments, image 510 may be a 3D frame from a 3D video. Image 510 corresponds to an image from the sequence of images corresponding to the positions of navigation element 522. Navigation element 522 is selectable and adjustable, such that a user may select an image to be displayed from the sequence of images, by moving the navigation element 522 to a region of plot 512 corresponding to the image. In this way, navigation to images within an image sequence which show divergence between the plurality of encoded label sets may performed intuitively, by adjusting a position of navigation element 522 to the graph of encoded label sets at the point of divergence.

Image 510 includes a first label 512a, and a second label 514a, superimposed thereon. First label 512a encloses a first region of image 510, while second label 514a encloses a second region of image 510. In some embodiments, first label 512a may be a segmentation mask from a first label set, indicating an ROI captured by image 510. In some embodiments, first label 512a may be a severity score, indicating a severity of a condition. In some embodiments, second label 514a may be a segmentation mask from a second label set, indicating an ROI captured by the image 510. In some embodiments, the second label 514a may be a severity score. The first label 512a is encoded as a first metric which is graphed on plot 512 at region 512b. Similarly, the second label 514a is encoded as a second metric which is graphed on plot 512 at region 514b.

Turning to FIG. 6, a method 600 for visualizing differences between two or more label sets for an image sequence is shown. Method 600 may be executed by a computing system, such as computing system 800 shown in FIG. 8. In one example, method 600 may be executed to evaluate differences between annotations produced by two or more annotators for a same sequence of images. In another example, method 600 may be executed to compare labels produced by an ML model against ground truth labels.

Method 600 begins at operation 602, wherein the computing system selects an image from a sequence of images. As discussed herein, a sequence of images may comprise a plurality of 2D or 3D images, such as a plurality of 2D slices in a 3D image, or a plurality of frames of a video. Images may be selected at operation 602 sequentially, or in parallel according to a multi-threading or multi-process approach. In some embodiments, images may be selected using an index, wherein a value of the index iterates over each image in the image sequence. In some embodiments, operation 602 does not include accessing the selected image from a location of non-transitory memory, but simply includes selecting a current index value associated with a particular image from the image sequence. In some embodiments, operation 602 may exclude images from selection for which no labels have been assigned, thereby conserving computational resources.

At operation 604, the computing system accesses a plurality of labels associated with the image selected at operation 602. In some embodiments, the image selected at operation 602 includes as meta-data one or more labels assigned thereto. In some embodiments, labels for a plurality of label sets may be stored in non-transitory memory, based on image position/image index, and operation 604 may include accessing from each of the plurality of label sets labels associated with the position/image index of the image selected at operation 604.

At operation 606, the computing system encodes the variation between the plurality of labels for the selected image as a comparison metric. In some embodiments, when each of the plurality of labels comprises a scalar value, such as a severity score, classification score, area, volume, or other scalar value, variation may be encoded as one of a variance, a standard deviation, or other statistical measure. In embodiments wherein the plurality of labels comprise a plurality of segmentation masks, the variation between the plurality of segmentation masks may be encoded as an area/volume of overlapping regions shared between each of the segmentation masks, and an average area/volume of non-overlapping regions for the plurality of segmentation masks. One example of process for determining variation between two or more segmentation masks is shown in FIG. 2, and described above. In some embodiments, operation 606 includes determining more than one comparison metric for the image selected at operation 602.

At operation 608, the computing system determines if the comparison metric for the selected image exceeds a comparison metric threshold. In some embodiments, the comparison metric threshold may be a pre-determined value. In some embodiments, the comparison metric threshold may be dynamically determined based on comparison metrics determined for other images of the image sequence. As an example, a comparison metric threshold may be determined based on a moving average of the comparison metric through the image sequence, such as by setting a comparison metric threshold to 120% of a moving average of the comparison metrics determined for previous images in the image sequence. If at operation 608 the computing system determines the comparison metric does not exceed the comparison metric threshold, method 600 may proceed to operation 612. However, if at operation 608 the computing system determines that the comparison metric exceeds the comparison metric threshold, method 600 may proceed to operation 610.

At operation 610, the computing system flags the image, or image sequence, to indicate that the divergence/variation between the label sets exceeds the comparison metric threshold. In some embodiments, flagging the image may include storing in non-transitory memory an indication of the index for the currently selected image, along with the comparison metric. In some embodiments, flagged images or image sequences may be pruned/removed from a training dataset. In some embodiments, when method 600 is applied to annotations produced by a plurality of annotators generating a ground truth dataset, flagging the image at operation 608 may include storing a scaling factor, wherein a loss associated with the image during a training process may be multiplied by the scaling factor to adjust the loss based on the variability of the associated image. In particular, a loss may be reduced for images in which ground truth label variation exceeds the comparison metric threshold, thereby de-emphasizing the impact of such images on the parameters of a ML model learning during training on such images. In some embodiments, flagging an image may include storing a "flag" as meta-data of the image. In some embodiments, flagging an image may include storing an image identifier, such as the image index, in a data structure comprising identifiers for flagged images in the current image sequence.

At operation 612, the computing system generates a plot of comparison metric versus image index by graphing the comparison metric determined for the image to a location of the plot corresponding to the magnitude of the comparison metric and the image index associated with the currently selected image. In some embodiments, the plot may comprise a first axis indicating a magnitude of the comparison metric, wherein larger values of comparison metric correspond to positions further from an origin of the first axis. The plot may further include a second axis indicating a position along the image sequence, wherein the position along the image sequence may be proportional to the index of the image. In some embodiments, operation 612 includes visually highlighting on the plot locations of flagged images in the image sequence. In one example, the computing system may adjust a color of comparison metrics flagged at operation 610. In some embodiments, the plot may include a visual indication of the comparison metric threshold, thereby visually highlighting which sub-regions of an image sequence exceed a threshold label variation.

At operation 614, the computing system displays a GUI including the plot and the image. In some embodiments, the image includes the plurality of labels superimposed thereon, such as is illustrated in GUIs 300 and 500. It will be appreciated that operations 602-612 may be repeated for each image in the image sequence, with operation 614 being executed after comparison metrics for each image in the image sequence have been determined. FIG. 3 shows an exemplary GUI which may be displayed by the computing system at operation 614.

At operation 616, the computing system determines if user input has been received from a user input device. User input devices may include substantially any user input device known in the art of computing systems, such as keyboards, mice, motion capture cameras, touchscreens, etc. User input may comprise selection of a region of the plot, movement of a navigation element displayed by the GUI, or selection of one or more images from the image sequence. If at operation 616 the computing system detects user input, method 600 may proceed to operation 620, wherein the GUI is updated based on the received user input. Following operation 620, method 600 may end. However, if at operation 616 the computing system does not detect user input, method 600 may proceed to operation 618, wherein the computing system continues to monitor for user input. Following operation 618, method 600 may end.

In this way, method 600 enables visualization of a compact representation of label variation through an image sequence, by mapping variation between a plurality of labels to one or more scalar values/comparison metrics for each image in the image sequence. Further, method 600 automatically detects comparison metrics exceeding a comparison metric threshold, and flags said images for further downstream processing/pruning.

Turning to FIG. 7, a method 700 for visualizing differences between two or more label sets for an image sequence is shown. Method 700 may be executed by a computing system, such as computing system 800 shown in FIG. 8. In one example, method 700 may be executed to evaluate differences between annotations produced by two or more annotators for a same sequence of images. In another example, method 700 may be executed to compare labels produced by an ML model against ground truth labels.

Method 700 begins at operation 702, wherein the computing system selects an image from a sequence of images. As discussed herein, a sequence of images may comprise a plurality of 2D or 3D images, such as a plurality of 2D slices in a 3D image, or a plurality of frames of a video. Images may be selected at operation 702 sequentially, or in parallel according to a multi-threading or multi-process approach. In some embodiments, images may be selected using an index, wherein a value of the index iterates over each image in the image sequence. In some embodiments, operation 702 does not include accessing the selected image from a location of non-transitory memory, but simply includes selecting a current index value associated with a particular image from the image sequence. In some embodiments, operation 702 may exclude images from selection for which no labels have been assigned, thereby conserving computational resources.

At operation 704, the computing system accesses a plurality of labels associated with the image selected at operation 702. In some embodiments, the image selected at operation 702 includes as meta-data one or more labels assigned thereto. In some embodiments, labels for a plurality of label sets may be stored in non-transitory memory, based on image position/image index, and operation 704 may include accessing from each of the plurality of label sets labels associated with the position/image index of the image selected at operation 704.

At operation 706, the computing system encodes the plurality of labels as a plurality of metrics. In some embodiments, labels may comprise real numbered values, such as a classification score, severity score, etc. and in such examples operation 706 may include encoding the real numbered values as a length of a segment, such as illustrated in FIG. 2. In some embodiments, each of the plurality of labels may comprise a multi-dimensional label, and in such embodiments operation 706 may include mapping the multi-dimensional label to a scalar valued metric, thereby encoding the multi-dimensional label as a one-dimensional metric which may be efficiently and compactly represented on a two axis plot. In one example, a multi-dimensional label may comprise a 2D or 3D segmentation mask, and mapping the label to one-dimensional metric may comprise determining an area or volume for the 2D or 3D segmentation mask, respectively.

At operation 708, the computing system determines if a variation between the plurality of encoded labels exceeds a variation threshold. In some embodiments, the variation threshold may be a pre-determined value. In some embodiments, the variation threshold may be dynamically determined based on a running average variation between the plurality of encoded metrics. As an example, a variation threshold may be determined based on a moving average of the variation through the image sequence, such as by setting a variation threshold to 120% of a moving average of the variation determined for previous images in the image sequence. If at operation 708 the computing system determines the variation does not exceed the variation threshold, method 700 may proceed to operation 712. However, if at operation 708 the computing system determines that the variation exceeds the variation threshold, method 700 may proceed to operation 710.

At operation 710, the computing system flags the image, or image sequence, to indicate that the divergence/variation between the label sets exceeds the variation threshold. In some embodiments, flagging the image may include storing in non-transitory memory an indication of the index for the currently selected image, along with the variation between the plurality of labels. In some embodiments, flagged images or image sequences may be pruned/removed from a training dataset. In some embodiments, when method 700 is applied to annotations produced by a plurality of annotators generating a ground truth dataset, flagging the image at operation 710 may include storing a scaling factor, wherein a loss associated with the image during a training process may be multiplied by the scaling factor to adjust the loss based on the variability of the associated image. In particular, a loss may be reduced for images in which ground truth label variation exceeds the variation threshold, thereby de-emphasizing the impact of such images on the parameters of a ML model learning during training on such images. In some embodiments, flagging an image may include storing a "flag" as meta-data of the image. In some embodiments, flagging an image may include storing an image identifier, such as the image index, in a data structure comprising identifiers for flagged images in the current image sequence.

At operation 712, the computing system generates a plot of encoded labels/metrics versus image index by graphing the metrics determined for the image to locations of the plot corresponding to the magnitudes of the metrics and the image index associated with the currently selected image. In some embodiments, the plot may comprise a first axis indicating a magnitude of the metrics, wherein larger values of metric correspond to positions further from an origin of the first axis. The plot may further include a second axis indicating a position along the image sequence, wherein the position along the image sequence may be proportional to the index of the image. In some embodiments, operation 712 includes visually highlighting on the plot locations of flagged images in the image sequence. In one example, the computing system may adjust a color of comparison metrics flagged at operation 710.

At operation 714, the computing system displays a GUI including the plot and the image. In some embodiments, the image includes the plurality of labels superimposed thereon, such as is illustrated in GUIs 300 and 500. It will be appreciated that operations 702-712 may be repeated for each image in the image sequence, with operation 714 being executed after labels for each image in the image sequence have been encoded as metrics. FIG. 5 shows an exemplary GUI which may be displayed by the computing system at operation 714.

At operation 716, the computing system determines if user input has been received from a user input device. User input devices may include substantially any user input device known in the art of computing systems, such as keyboards, mice, motion capture cameras, touchscreens, etc. User input may comprise selection of a region of the plot, movement of a navigation element displayed by the GUI, or selection of one or more images from the image sequence. If at operation 716 the computing system detects user input, method 700 may proceed to operation 720, wherein the GUI is updated based on the received user input. Following operation 720, method 700 may end. However, if at operation 716 the computing system does not detect user input, method 700 may proceed to operation 718, wherein the computing system continues to monitor for user input. Following operation 718, method 700 may end.

In this way, method 700 enables visualization of a compact representation of label variation through an image sequence, encoding each of a plurality of labels for each image of an image sequence to a plurality of scalar metrics, which are then displayed as a function of image index for each image in the image sequence. Further, method 700 automatically detects images with label variation greater than a variation threshold, and flags said images for further downstream processing/pruning.

Figure 8:
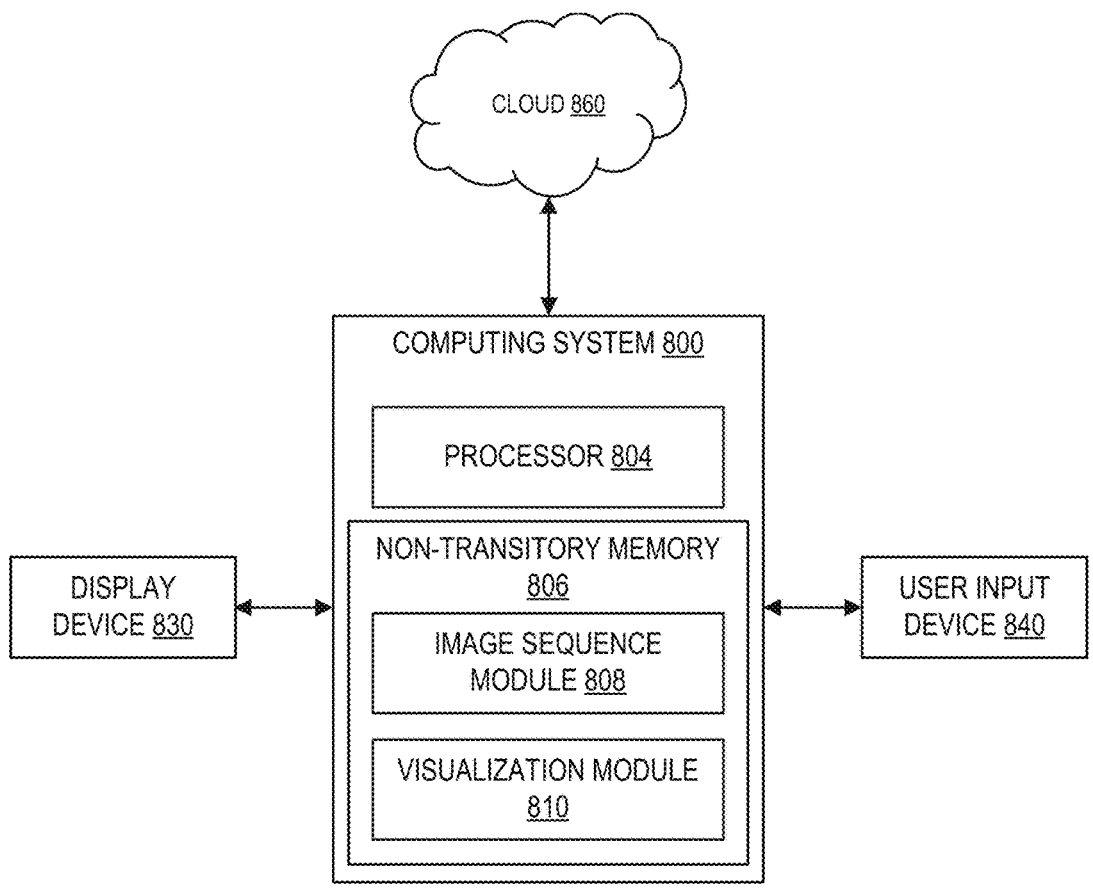
FIG. 8 shows an embodiment of a computing system configured to execute one or more of the methods and processes disclosed herein.

Referring to FIG. 8, a computing system 800 is shown, in accordance with an exemplary embodiment. In some embodiments, at least a portion of computing system 800 is disposed at a remote device (e.g., edge device, server, etc.) communicably coupled to computing system 800 via wired and/or wireless connections. In some embodiments, at least a portion of computing system 800 is disposed at a separate device (e.g., a workstation) which can receive image sequences, labels, GUIs, etc. from the imaging computing 800.

Computing system 800 includes a processor 804 configured to execute machine readable instructions stored in non-transitory memory 806. Processor 804 may be single core or multi-core, and the programs executed thereon may be configured for parallel or distributed processing. In some embodiments, the processor 804 may optionally include individual components that are distributed throughout two or more devices, which may be remotely located and/or configured for coordinated processing. In some embodiments, one or more aspects of the processor 804 may be virtualized and executed by remotely-accessible networked computing devices configured in a cloud computing configuration.

Non-transitory memory 806 stores image sequence module 808 and visualization module 810. Image sequence module 808 may store one or more image sequences, including labeled and/or unlabeled image sequences. Images stored in image sequence module may be indexed, thereby preserving the order of each image within its respective image sequence. Image sequence module 808 may further include one or more label sets associated with image sequences stored therein. For example, a plurality of distinct label sets for a single image sequence may be stored in image sequence module 808, wherein each label may be mapped to a corresponding image in the image sequence using an index.

Visualization module 810 may include machine executable instructions for encoding a plurality of labels into a comparison metric, or metric, and for visualizing said plurality of comparison metrics, or metrics, as a function of image index. For example, visualization module 810 may store instructions for implementing executing one or more steps of methods 600 and 700, described above.

In some embodiments, the non-transitory memory 806 may include components disposed at two or more devices, which may be remotely located and/or configured for coordinated processing. In some embodiments, one or more aspects of the non-transitory memory 806 may include remotely-accessible networked storage devices configured in a cloud computing configuration.

Computing system 800 further includes user input device 840. User input device 840 may comprise one or more of a touchscreen, a keyboard, a mouse, a trackpad, a motion sensing camera, or other device configured to enable a user to interact with and manipulate data within computing system 800. In one example, user input device 840 may enable a user to interact with a GUI or plot, such is described in more detail above, with reference to FIGS. 3, 4, and 5.

Computing system 800 further includes display device 830. Display device 830 may include one or more display devices utilizing virtually any type of technology. Display device 830 may be combined with processor 804, non-transitory memory 806, and/or user input device 840 in a shared enclosure, or may be peripheral display device and may comprise a monitor, touchscreen, projector, or other display device known in the art, which may enable a user to view 2D images, 3D images, and/or visualize the plots and GUIs discussed herein.

The disclosure also provides support for a method comprising: selecting an image from a sequence of images, wherein the image includes an index indicating a position of the image in the sequence of images, determining a first metric for the image, wherein the first metric encodes a first label of a first label set assigned to the image, determining a second metric for the image, wherein the second metric encodes a second label of a second label set assigned to the image, generating a plot, wherein the first metric and the second metric are graphed as a function of the index of the image, displaying the plot via a display device, receiving a selection of a region of the plot corresponding to the image, retrieving the image from the sequence of images, retrieving the first label and the second label, and displaying the image, the plot, the first label, and the second label, via the display device. In a first example of the method, the sequence of images comprise a plurality of two-dimensional frames or three-dimensional frames of a video, and wherein the image is a frame of the video occurring at a point in time indicated by the index. In a second example of the method, optionally including the first example, the sequence of images comprise a stack of two-dimensional slices of a three-dimensional image, and wherein the image is a two-dimensional slice of the three-dimensional image along a plane corresponding to the index. In a third example of the method, optionally including one or both of the first and second examples, the first label is a first multi-dimensional label, the second label is a second multi-dimensional label, and wherein determining the first metric for the image comprises mapping the first multi-dimensional label to the first metric, wherein the first metric is a first scalar value, and wherein determining the second metric for the image comprises mapping the second multi-dimensional label to the second metric, wherein the second metric is a second scalar value. In a fourth example of the method, optionally including one or more or each of the first through third examples, the first multi-dimensional label is a segmentation mask of a region of interest captured by the image, and wherein mapping the first multi-dimensional label to the first metric comprises, determining a number of pixels or voxels occupied by the segmentation mask, and setting the first scalar value based on the number of pixels or voxels. In a fifth example of the method, optionally including one or more or each of the first through fourth examples the method further comprising: responding to a difference between the first metric and second metric exceeding a threshold by: highlighting the region of the plot corresponding to the image. In a sixth example of the method, optionally including one or more or each of the first through fifth examples, the first label set comprises predictions generated by a machine learning model, and wherein the second label set comprises ground truth labels. In a seventh example of the method, optionally including one or more or each of the first through sixth examples, the first label set comprises a first set of annotations produced by a first annotator, and wherein the second label set comprises a second set of annotations produced by a second annotator. In an eighth example of the method, optionally including one or more or each of the first through seventh examples the method further comprising: responding to a difference between the first metric and the second metric exceeding a threshold by: flagging the first set of annotations and the second set of annotations for review.

The disclosure also provides support for a method comprising: selecting an image from a sequence of images, wherein the image includes an index indicating a position of the image in the sequence of images, determining a comparison metric for the image, wherein the comparison metric encodes a variation between at least a first label of a first label set assigned to the image and a second label of a second label set assigned to the image, generating a plot, wherein the plot comprises a first axis indicating a comparison metric magnitude, and a second axis indicating position along the sequence of images, wherein the comparison metric determined for the image is graphed on the plot at a point corresponding to the comparison metric and the index of the image, and displaying a graphical user interface via a display device, wherein the graphical user interface includes the plot, a navigation element selectable to navigate through the sequence of images, and the image, wherein a current position of the navigation element along the second axis corresponds to the position of the image in the sequence of images. In a first example of the method, the first label and the second label are one of a severity score, a classification score, and a segmentation mask. In a second example of the method, optionally including the first example, the sequence of images comprise a plurality of two-dimensional images, the first label comprises a first segmentation mask of a region of interest captured by the image, the second label comprises a second segmentation mask of the region of interest captured by the image, and wherein the comparison metric comprises one of an area of overlap between the first segmentation mask and the second segmentation mask, an area of the first segmentation mask not intersecting the second segmentation mask, and an area of the second segmentation mask not intersecting the first segmentation mask. In a third example of the method, optionally including one or both of the first and second examples, the sequence of images comprise a plurality of three-dimensional images, the first label comprises a first segmentation mask of a region of interest captured by the image, the second label comprises a second segmentation mask of the region of interest captured by the image, and wherein the comparison metric comprises one of a volume of overlap between the first segmentation mask and the second segmentation mask, a volume of the first segmentation mask not intersecting the second segmentation mask, and a volume of the second segmentation mask not intersecting the first segmentation mask.

The disclosure also provides support for a system comprising: a display device, a user input device, a memory, wherein the memory stores machine executable instructions, and a processor communicably coupled to the display device, the user input device, and the memory, and wherein, when executing the instructions, the processor is configured to: determine a plurality of comparison metrics for a sequence of images, wherein a first comparison metric of the plurality of comparison metrics encodes for a first image of the sequence of images a first variation between a first plurality of labels assigned to the first image, and wherein a second comparison metric of the plurality of comparison metrics encodes for a second image of the sequence of images a second variation between a second plurality of labels assigned to the second image, generate a plot, wherein the plot shows the plurality of comparison metrics graphed as a function of image position within the sequence of images, display a graphical user interface via the display device, wherein the graphical user interface includes the plot, a navigation element selectable to navigate through the sequence of images, and the first image, wherein the navigation element is shown at a first location of the plot corresponding to the first comparison metric, and update the graphical user interface in response to input received via the user input device by: adjusting the navigation element from the first location of the plot to a second location of the plot, wherein the second location of the plot corresponds to the second comparison metric, and replace the first image with the second image in the graphical user interface. In a first example of the system, the graphical user interface includes the first plurality of labels superimposed on the first image, and wherein replacing the first image with the second image includes replacing the first plurality of labels with the second plurality of labels. In a second example of the system, optionally including the first example, the first plurality of labels comprise a plurality of segmentation masks produced for a region of interest captured in the first image. In a third example of the system, optionally including one or both of the first and second examples, a first label of the first plurality of labels is a ground truth segmentation mask of the region of interest, and wherein a second label of the first plurality of labels is a segmentation mask of the region of interest predicted by a machine learning model. In a fourth example of the system, optionally including one or more or each of the first through third examples, the first comparison metric comprises one of a variance, a range, and a standard deviation of the first plurality of labels. In a fifth example of the system, optionally including one or more or each of the first through fourth examples, the first plurality of labels comprise a first label produced by a first annotator, and wherein a second label of the first plurality of labels comprises a second label produced by a second annotator. In a sixth example of the system, optionally including one or more or each of the first through fifth examples, the processor, when executing the instructions, is further configured to: determine if the first comparison metric is greater than a threshold, and respond to the first comparison metric being greater than the threshold by: flagging the first plurality of labels.

As used herein, an element or step recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
   selecting an image from a sequence of images, wherein the image includes an index indicating a position of the image in the sequence of images;
   determining a first metric for the image, wherein the first metric encodes a first label of a first label set assigned to the image;
   determining a second metric for the image, wherein the second metric encodes a second label of a second label set assigned to the image;
   generating a plot, wherein the first metric and the second metric are graphed as a function of the index of the image;
   displaying the plot via a display device;
   receiving a selection of a region of the plot corresponding to the image;
   retrieving the image from the sequence of images;
   retrieving the first label and the second label; and
   displaying the image, the plot, the first label, and the second label, via the display device.

2. The method of claim 1, wherein the sequence of images comprise a plurality of two-dimensional frames or three-dimensional frames of a video, and wherein the image is a frame of the video occurring at a point in time indicated by the index.

3. The method of claim 1, wherein the sequence of images comprise a stack of two-dimensional slices of a three-dimensional image, and wherein the image is a two-dimensional slice of the three-dimensional image along a plane corresponding to the index.

4. The method of claim 1, wherein the first label is a first multi-dimensional label, the second label is a second multi-dimensional label, and wherein determining the first metric for the image comprises mapping the first multi-dimensional label to the first metric, wherein the first metric is a first scalar value, and wherein determining the second metric for the image comprises mapping the second multi-dimensional label to the second metric, wherein the second metric is a second scalar value.

5. The method of claim 4, wherein the first multi-dimensional label is a segmentation mask of a region of interest captured by the image, and wherein mapping the first multi-dimensional label to the first metric comprises;
   determining a number of pixels or voxels occupied by the segmentation mask; and
   setting the first scalar value based on the number of pixels or voxels.

6. The method of claim 1, the method further comprising:
   responding to a difference between the first metric and second metric exceeding a threshold by:
     highlighting the region of the plot corresponding to the image.

7. The method of claim 1, wherein the first label set comprises predictions generated by a machine learning model, and wherein the second label set comprises ground truth labels.

8. The method of claim 1, wherein the first label set comprises a first set of annotations produced by a first annotator, and wherein the second label set comprises a second set of annotations produced by a second annotator.

9. The method of claim 8, the method further comprising:
   responding to a difference between the first metric and the second metric exceeding a threshold by:
     flagging the first set of annotations and the second set of annotations for review.

10. A method comprising:
    selecting an image from a sequence of images, wherein the image includes an index indicating a position of the image in the sequence of images;
    determining a comparison metric for the image, wherein the comparison metric encodes a variation between at least a first label of a first label set assigned to the image and a second label of a second label set assigned to the image;
    generating a plot, wherein the plot comprises a first axis indicating a comparison metric magnitude, and a second axis indicating position along the sequence of images, wherein the comparison metric determined for the image is graphed on the plot at a point corresponding to the comparison metric and the index of the image; and displaying a graphical user interface via a display device, wherein the graphical user interface includes the plot, a navigation element selectable to navigate through the sequence of images, and the image, wherein a current position of the navigation element along the second axis corresponds to the position of the image in the sequence of images.

11. The method of claim 10, wherein the first label and the second label are one of a severity score, a classification score, and a segmentation mask.

12. The method of claim 10, wherein the sequence of images comprise a plurality of two-dimensional images, the first label comprises a first segmentation mask of a region of interest captured by the image, the second label comprises a second segmentation mask of the region of interest captured by the image, and wherein the comparison metric comprises one of an area of overlap between the first segmentation mask and the second segmentation mask, an area of the first segmentation mask not intersecting the second segmentation mask, and an area of the second segmentation mask not intersecting the first segmentation mask.

13. The method of claim 10, wherein the sequence of images comprise a plurality of three-dimensional images, the first label comprises a first segmentation mask of a region of interest captured by the image, the second label comprises a second segmentation mask of the region of interest captured by the image, and wherein the comparison metric comprises one of a volume of overlap between the first segmentation mask and the second segmentation mask, a volume of the first segmentation mask not intersecting the second segmentation mask, and a volume of the second segmentation mask not intersecting the first segmentation mask.

14. A system comprising:
 a display device;
 a user input device;
 a memory, wherein the memory stores machine executable instructions; and
 a processor communicably coupled to the display device, the user input device, and the memory, and wherein, when executing the instructions, the processor is configured to:
  determine a plurality of comparison metrics for a sequence of images, wherein a first comparison metric of the plurality of comparison metrics encodes for a first image of the sequence of images a first variation between a first plurality of labels assigned to the first image, and wherein a second comparison metric of the plurality of comparison metrics encodes for a second image of the sequence of images a second variation between a second plurality of labels assigned to the second image;
  generate a plot, wherein the plot shows the plurality of comparison metrics graphed as a function of image position within the sequence of images;
  display a graphical user interface via the display device, wherein the graphical user interface includes the plot, a navigation element selectable to navigate through the sequence of images, and the first image, wherein the navigation element is shown at a first location of the plot corresponding to the first comparison metric; and
  update the graphical user interface in response to input received via the user input device by:
   adjusting the navigation element from the first location of the plot to a second location of the plot, wherein the second location of the plot corresponds to the second comparison metric; and
   replace the first image with the second image in the graphical user interface.

15. The system of claim 14, wherein the graphical user interface includes the first plurality of labels superimposed on the first image, and wherein replacing the first image with the second image includes replacing the first plurality of labels with the second plurality of labels.

16. The system of claim 15, wherein the first plurality of labels comprise a plurality of segmentation masks produced for a region of interest captured in the first image.

17. The system of claim 16, wherein a first label of the first plurality of labels is a ground truth segmentation mask of the region of interest, and wherein a second label of the first plurality of labels is a segmentation mask of the region of interest predicted by a machine learning model.

18. The system of claim 14, wherein the first comparison metric comprises one of a variance, a range, and a standard deviation of the first plurality of labels.

19. The system of claim 14, wherein the first plurality of labels comprise a first label produced by a first annotator, and wherein a second label of the first plurality of labels comprises a second label produced by a second annotator.

20. The system of claim 14, wherein the processor, when executing the instructions, is further configured to:
 determine if the first comparison metric is greater than a threshold; and
 respond to the first comparison metric being greater than the threshold by:
  flagging the first plurality of labels.

* * * * *